United States Patent
Oi et al.

(10) Patent No.: US 6,198,384 B1
(45) Date of Patent: Mar. 6, 2001

(54) SYSTEM POWER SUPPLY CONTROL FOR INTERFACE CIRCUIT

(75) Inventors: Kenji Oi; Takashi Shimizu; Hirotaka Ueno; Hiroshi Takase, all of Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/427,012

(22) Filed: Oct. 25, 1999

(30) Foreign Application Priority Data

Oct. 26, 1998 (JP) .................................................. 10-304231

(51) Int. Cl.⁷ ....................................................... G08B 1/00
(52) U.S. Cl. ...................... 340/333; 340/693.1; 710/100; 713/300
(58) Field of Search .................................. 340/333, 693.1; 710/100, 101, 103, 104, 105, 107, 128, 129, 9, 16, 18, 8, 15; 713/300, 310, 323, 324, 330, 340, 400; 307/38, 41, 131, 86, 23; 361/683, 686; 375/257, 220

(56) References Cited

U.S. PATENT DOCUMENTS

| | | | | |
|---|---|---|---|---|
| 5,793,124 | * | 8/1998 | Mitzaki | 307/66 |
| 5,948,085 | * | 9/1999 | Blatter | 710/100 |
| 5,987,545 | * | 11/1999 | Oh | 710/100 |
| 6,041,414 | * | 3/2000 | Kikuvhi | 713/300 |

* cited by examiner

Primary Examiner—Daniel J. Wu
Assistant Examiner—Anh La
(74) Attorney, Agent, or Firm—Arent Fox Kintner Plotkin & Kahn, PLLC (57) ABSTRACT

An interface circuit including an interface controller operated by at least a system power supply or an external power supply. A switch is connected between an interface controller and a system power circuit for conducting system power. The interface controller includes a control signal generating circuit for generating a control signal that closes the switch at a timing that does not affect data transmission performed by the interface circuit in accordance with a trigger signal, which indicates that the system power has gone on. Similarly, the switch is opened at a time when data transmission will not be affected.

27 Claims, 7 Drawing Sheets

SYSTEM POWER SUPPLY CONTROL FOR INTERFACE CIRCUIT

BACKGROUND OF THE INVENTION

The present invention relates to an interface circuit, and more particularly, to the control system power supplied to an interface circuit which performs data transmission between devices.

Interfaces are used to transmit data between personal computers and peripheral equipment, such as audio and video equipment or digital cameras. The interfaces of connected apparatuses are connected to one another by cables that include power lines and data lines. There is a type of interface that supplies power from one apparatus to another apparatus via the personal computer regardless of whether the system power of the personal computer is off. Among such interfaces, the IEEE1394 standard interface has attracted much attention.

Figure 1:
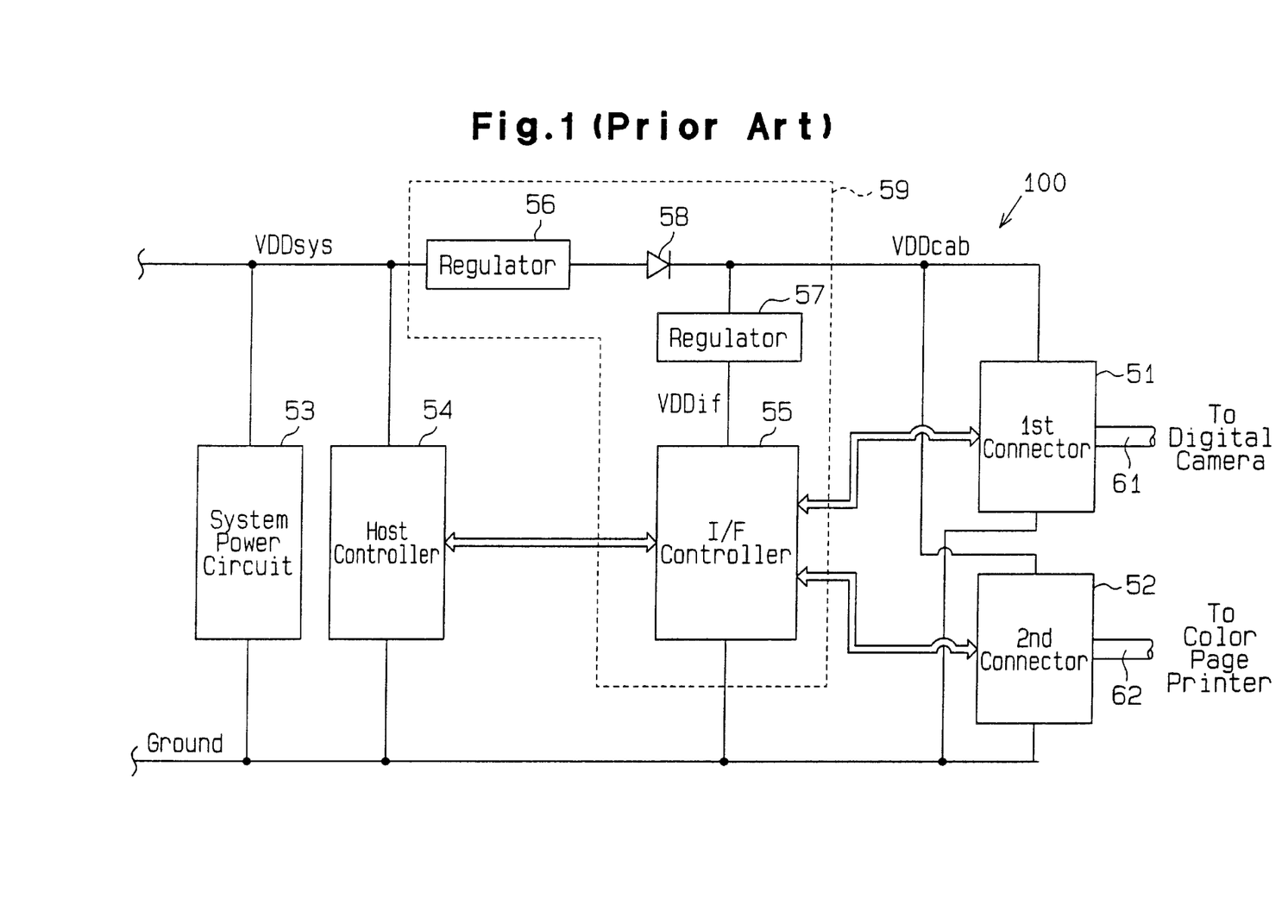
FIG. 1 is a block diagram showing a prior art example of a data transmission device.

FIG. 1 is a block diagram showing a data transmission device 100, which is provided with an interface. The data transmission device 100 is incorporated in a personal computer. Further, the data transmission device 100 includes two connectors 51, 52, a host controller 54, and an interface circuit 59, which has an interface (I/F) controller 55, two regulators 56, 57, and a diode 58. A system power circuit 53 is also incorporated in the personal computer.

The first connector 51 is connected to a first peripheral apparatus (not shown, in this case, a digital camera) via a first cable 61. The second connector 52 is connected to a second apparatus (not shown, in this case, a color page printer) via a second cable 62. Each cable 61, 62 is a six line cable having a positive power line, a ground power line, and four signal lines.

When the power of the personal computer is turned on, the host controller 54 is supplied with system power VDDsys which is generated by the system power circuit 53. Furthermore, the I/F controller 55 is supplied with operation power VDDif by way of the regulator 56, the diode 58, and the regulator 57. When the power of the personal computer is cut off, the supply of system power VDDsys from the system power circuit 53 is stopped. This opens the host controller 54.

If the digital camera and the color page printer are activated in this state, the regulator 57 is provided with cable power VDDcab from the digital camera via the first cable 61 and the first connector 51 (or from the color page printer via the second cable 62 and the second connector 52). The regulator 57 generates the power supply VDDif based on the cable power VDDcab and activates the I/F controller 55 with the power supply VDDif. Accordingly, even if the power of the personal computer is off, the I/F controller 55 receives data from the digital camera via the cable 61 and the first connector 51 and transmits the data to the color page printer via the second connector 52 and the cable 62.

However, if the power of the personal computer is turned on when the I/F controller 55 is performing data transmission, power supply noise mixes with the system power VDDsys. The power supply noise also mixes with the operation power VDDif of the I/F controller 55. As a result, the I/F controller 55 may function abnormally and affect the transmission of data in an undesirable manner.

SUMMARY OF THE INVENTION

Accordingly, it is an objective of the present invention to provide an interface circuit that prevents power supply noise from affecting the interface.

To achieve the above objective, the present invention provides a method for controlling a system power supply to an interface circuit that is operated by at least the system power supply or an external power supply. The interface circuit performs data transmission.

In one aspect of the present invention, the method includes generating a trigger signal indicating that the system power supply has gone on, and closing a switch between the system power supply and the interface circuit at a timing that does not affect the data transmission in accordance with the trigger signal.

In another aspect of the present invention, the method includes generating a trigger signal indicating that the system power supply has gone off, and opening the switch at a time that does not affect the data transmission in accordance with the trigger signal.

In a further aspect of the present invention, the method includes generating a first trigger signal indicating that the system power supply has gone on, closing the switch at a timing that does not affect the data transmission in accordance with the first trigger signal, generating a second trigger signal indicating that the system power supply has gone off, and opening the switch at a timing that does not affect the data transmission in accordance with the second trigger signal The present invention also provides an interface circuit for performing data transmission. The interface circuit includes an interface controller operated by at least a system power supply or an external power supply, and a switch connected between an interface controller and a system power circuit for conducting system power.

In one aspect of the present invention, the interface controller of the interface circuit includes a control signal generating circuit for generating a control signal that closes the switch at a timing that does not affect the data transmission in accordance with a trigger signal, which indicates that the system power has gone on.

In another aspect of the present invention, the interface controller of the interface circuit includes a control signal generating circuit for generating a control signal that opens the switch at a timing that does not affect the data transmission in accordance with a trigger signal, which indicates that the system power has gone off.

In a further aspect of the present invention, the interface controller of the interface circuit includes a control signal generating circuit for generating a first control signal that closes the switch at a timing that does not affect the data transmission in accordance with a first trigger signal, which indicates that the system power has gone on. The control signal generating circuit further generates a second control signal that opens the switch at a timing that does not affect the data transmission in accordance with a second trigger signal, which indicates that the system power has gone off.

The present invention further provides a data transmission device including an interface circuit that performs data transmission, and a host controller connected to the interface circuit, wherein control signals are transmitted between the host controller and the interface circuit to control data transmission therebetween. The interface circuit includes an interface controller operated by at least a system power supply or an external power supply, and a switch connected between the interface controller and a system power circuit for conducting system power.

In one aspect of the present invention, the interface controller of the interface circuit provided in the data transmission device has a control signal generating circuit for generating a control signal that closes the switch at a timing that does not affect the data transmission in accordance with a trigger signal, which indicates that the system power has gone on.

In another aspect of the present invention, the interface controller of the interface circuit provided in the data transmission device has a control signal generating circuit for generating a control signal that opens the switch at a timing that does not affect data transmission in accordance with a trigger signal, which indicates that the system power has gone off.

In a further aspect of the present invention, the interface controller of the interface circuit provided in the data transmission device has a control signal generating circuit for generating a first control signal that closes the switch at a timing that does not affect the data transmission in accordance with a first trigger signal, which indicates that the system power has gone on. The control signal generating circuit further generates a second control signal that opens the switch at a timing that does not affect the data transmission in accordance with a second trigger signal, which indicates that the system power has gone off.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 2:
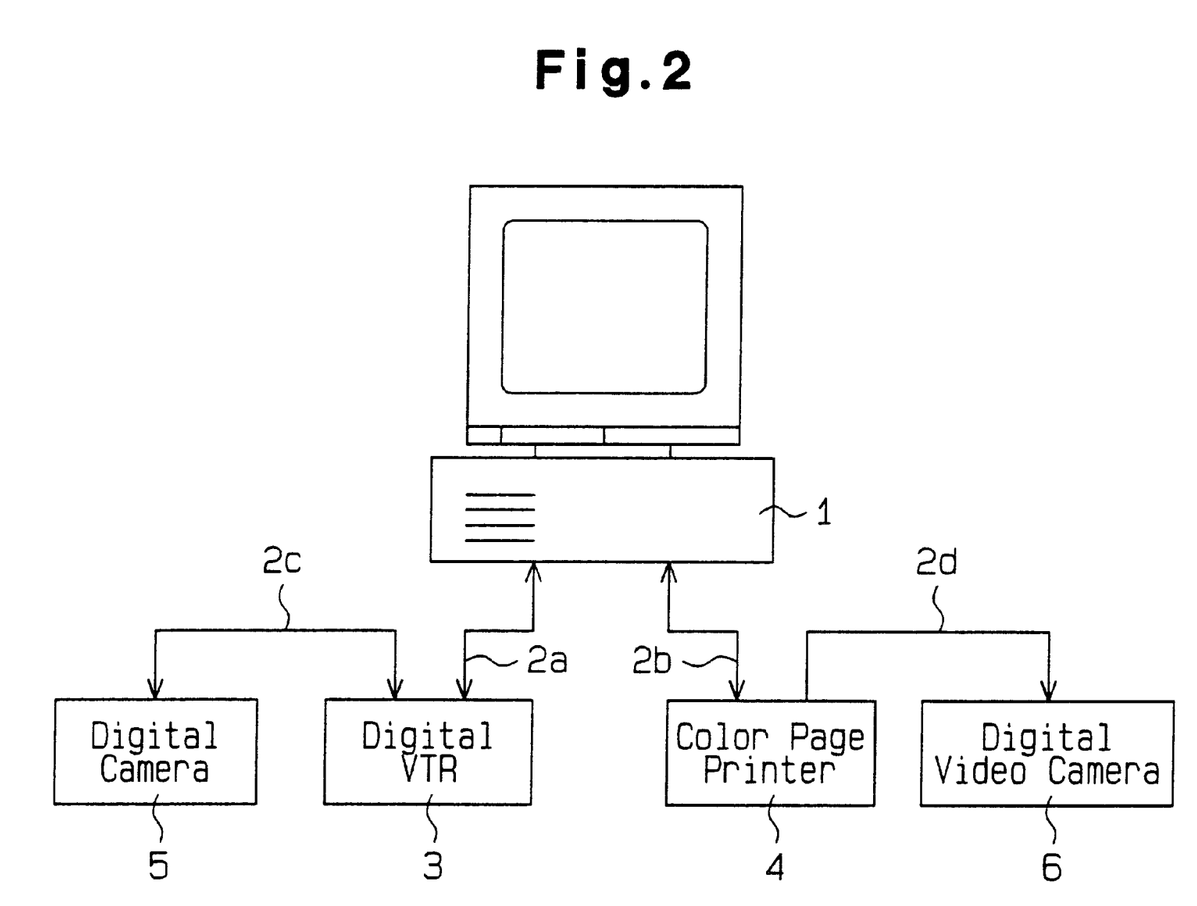
FIG. 2 is a block diagram showing a system formed by a personal computer and peripheral equipment.

FIG. 2 is a block diagram showing a system formed by a personal computer 1 and peripheral apparatuses 3–6. The personal computer 1 is connected to a digital VTR 3 by a first cable 2a and to a color page printer 4 by a second cable 2b. The digital VTR 3 is connected to a digital camera 5 by a third cable 2c. The color page printer 4 is connected to a digital video camera 6 by a fourth cable 2d.

Each of the first to fourth cables 2a–2d is a six line cable having four data transmission signal lines, a positive power line through which cable power VDDcab is supplied, and a ground power line. The cables 2a–2d are used to transmit data and supply cable power VDDcab between the personal computer 1 and the peripheral apparatuses 3–6 or between the peripheral apparatuses 3–6.

Figure 3:
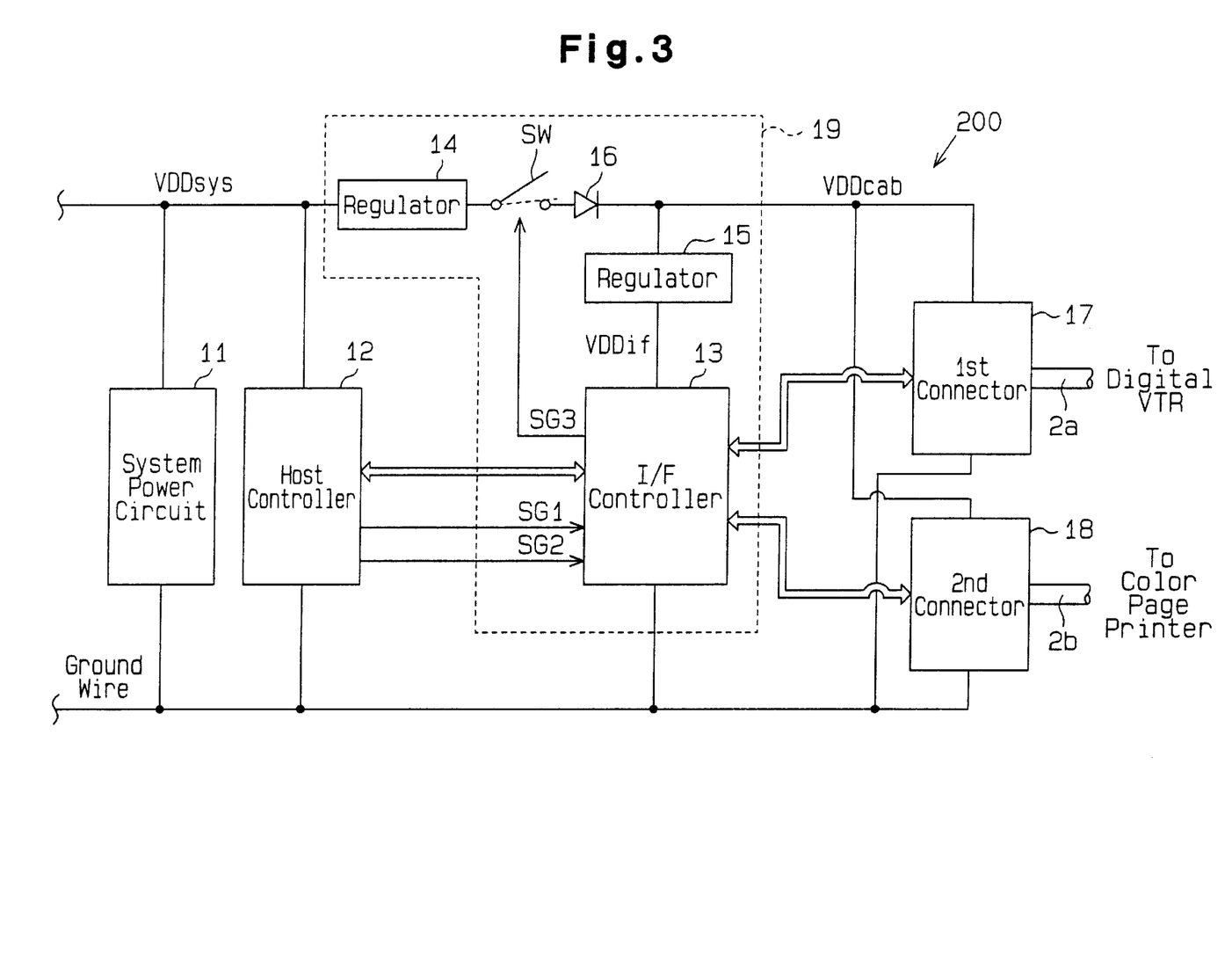
FIG. 3 is a block diagram showing a data transmission device according to the present invention.

FIG. 3 is a block diagram showing a data transmission device 200. Each of the peripheral apparatuses 3–6 has a data transmission device, the structure of which is the same as the data transmission device 200.

A system power circuit 11 and the data transmission device 200 are incorporated in the personal computer 1. The data transmission device 200 includes two connectors 17, 18, a host controller 12, and an interface circuit 19 having an interface (I/F) controller 13, two regulators 14, 15, a diode 16, and a switch SW. The interface circuit 19 and the host controller 12 are preferably installed on a motherboard.

When the power switch of the personal computer 1 is turned on, the system power circuit 11 generates system power VDDsys, which is supplied to the host controller 12 as operation power. When the switch SW is connected and closed, the system power VDDsys is supplied as operation power VDDif to the I/F controller 13 via the regulator 14, the switch SW, the diode 16 and the regulator 15.

The host controller 12 is activated only when the system power VDDsys is being supplied. Control data used to control data transmission is transmitted between the host controller 12 and the I/F controller 13. The control data is used to determine the following:

1) how to process the data received by the I/F controller 13;
2) to which internal device of the personal computer 1 should the data be transmitted; and
3) how to process the transmission data, which is generated by an internal device, in order to transmit the data to the other peripheral apparatuses 3–6 via the I/F controller 13.

Figure 6:
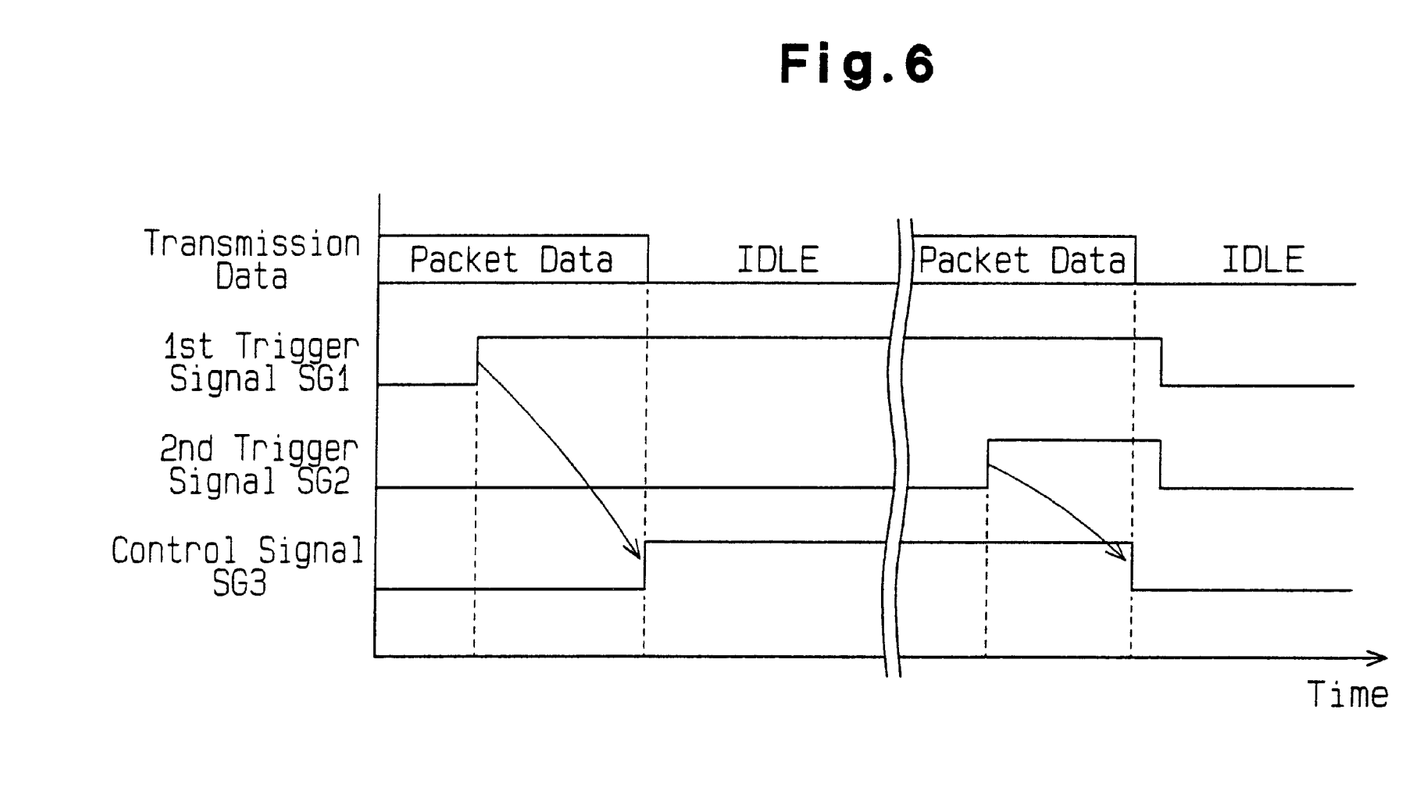
FIG. 6 is a timing chart showing the operation of the I/F controller of FIG. 4.

When the power switch of the personal computer 1 is turned on, the host controller 12 provides the I/F controller 13 with a high first trigger signal SG1 (FIG. 6). If an OFF command of the power switch of the personal computer 1 is issued (when a disconnection process, or off sequence, is commenced), the host controller 12 provides the I/F controller 13 with a high second trigger signal SG2. The high trigger signals SG1, SG2 fall when the supply of the system power VDDsys to the host controller 12 is stopped.

The I/F controller 13 provides a control signal SG3 to the switch SW in accordance with the first and second trigger signals SG1, SG2. When the control signal SG3 is high, the switch SW is closed. This supplies the regulator 15 with the system power VDDsys via the regulator 14, the switch SW, and the diode 16. The operation power VDDif from the regulator 15 is further supplied to the I/F controller 13.

In this state, if the power of the digital VTR 3 or the color page printer 4 is turned on, the cable power VDDcab is supplied to the regulator 15 from the VTR 3 or the printer 4 via the respective connectors 17, 18. The regulator 15 generates operation power VDDif from the system power VDDsys and the cable power VDDcab.

If the control signal SG3 is low, the switch SW is opened and the system power VDDsys is not supplied to the regulator 15. Thus, the regulator 15 does not generate the operation power VDDif. In this state, if the power of the digital VTR 3 or the color page printer 4 is on, the regulator 15 generates the operation power VDDif from the cable power VDDcab. That is, the operation power VDDif is generated regardless of whether or not the regulator 15 is supplied with the system power VDDsys. Accordingly, the I/F controller 13 continues to operate even though the system power VDDsys is not supplied and, for example, allows data transmission between the digital VTR 3 and the color page printer 4.

Figure 4:
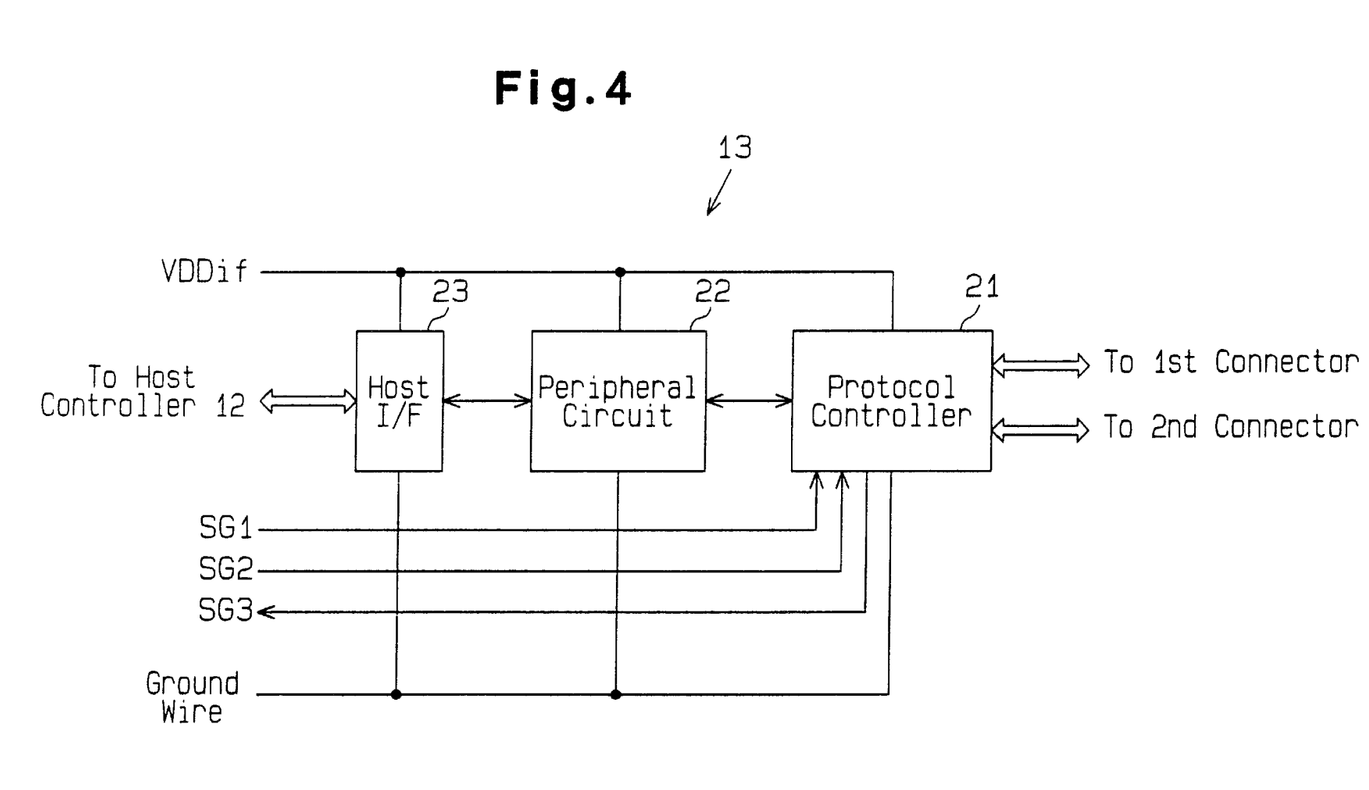
FIG. 4 is a block diagram showing an I/F controller of the data transmission device of FIG. 3.

The I/F controller 13 satisfies the IEEE1394 standard. More specifically, as shown in FIG. 4, the I/F controller 13 includes an IEEE1394 protocol controller 21, a peripheral circuit 22, and a host interface (I/F) 23.

Control data is transmitted between the protocol controller 21 and the host controller 12 via the peripheral circuit 22 and the host I/F 23. The peripheral circuit 22 includes a clock signal generating circuit and a RAM. The clock signal generating circuit generates a clock signal used during the transmission of control data between the controllers 12, 21. The RAM temporarily stores the control data. The host I/F 23 inputs and outputs control data between the controllers 12, 21. The protocol controller 21 receives the first and second trigger signals SG1, SG2 from the host controller 12 and provides the control switch SW with the control signal SG3.

Figure 5:
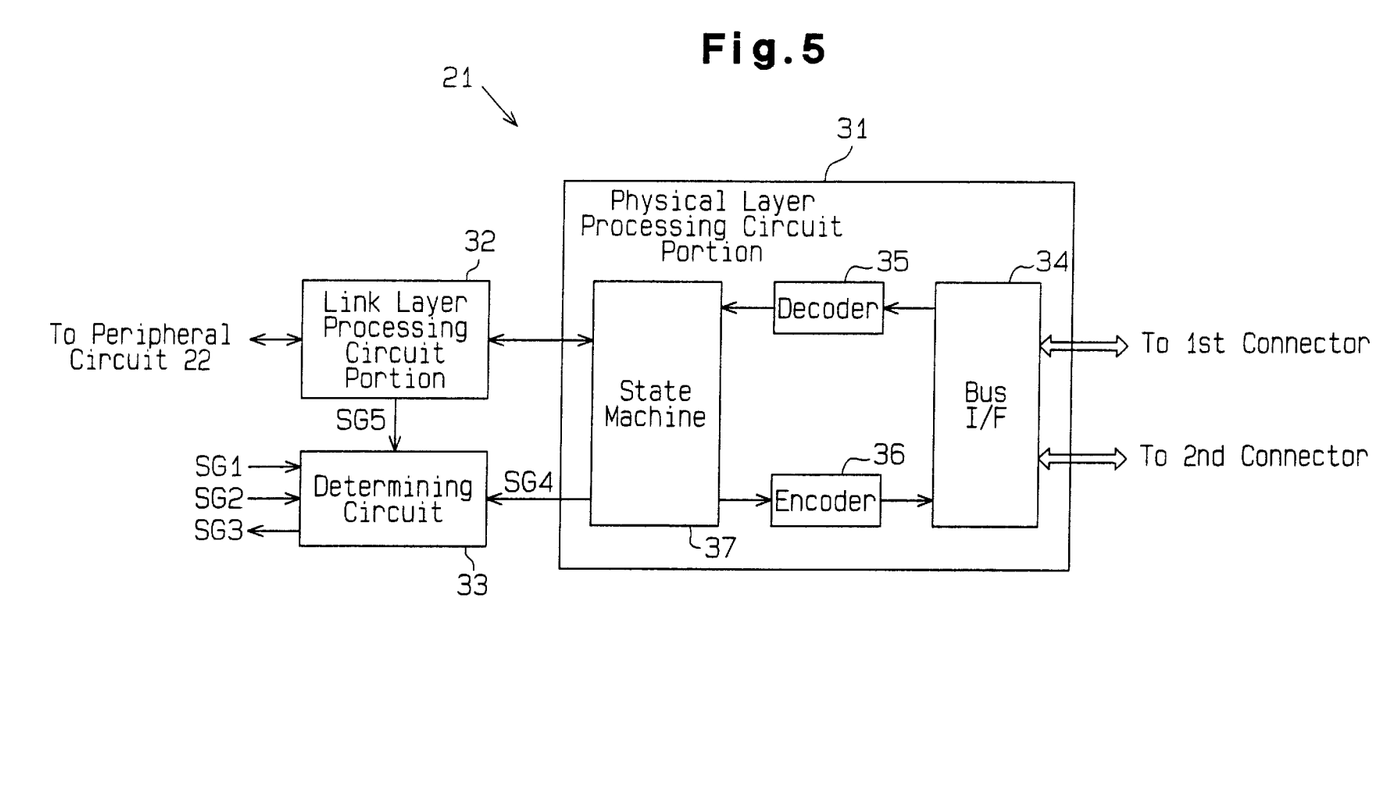
FIG. 5 is a block diagram showing a protocol controller of the I/F controller of FIG. 4.

As shown in FIG. 5, the protocol controller 21 includes a physical layer processing circuit portion 31, a link layer processing circuit portion 32, and a determining circuit 33. The physical layer processing circuit portion 31 has a bus interface (I/F) 34, a decoder 35, an encoder 36, and a state machine 37.

The bus I/F 34 is connected to the first and second connectors 17, 18. The first connector 17 is connected to the digital VTR 3 via the first cable 2a and the second connector 18 is connected to the color page printer 4 via the second cable 2b.

The state machine 37 receives data from an I/F controller of the digital VTR 3 via the first connector 17, the bus I/F 34, and the decoder 35 and transmits the data to the link layer processing circuit portion 32. The state machine 37 also transmits data to the color page printer 4 via the encoder 36, the bus I/F 34, the second connector 18, and the second cable 2b.

Furthermore, the state machine 37 receives data from an I/F controller of the color page printer 4 via the second connector 18, the bus I/F 34, and the decoder 35 and transmits the data to the link layer processing circuit portion 32. The state machine 37 transmits data to the digital VTR 3 via the encoder 36, the bus I/F 34, the first connector 17, and the first cable 2a. Additionally, the state machine 37 receives data from the link layer processing circuit portion 32 and transmits the data to the first and second connectors 17 and 18 via the encoder 36 and the bus I/F 34. Accordingly, the transfer data output from the link layer processing circuit portion 32 is transferred to the I/F controllers of the digital VTR 3 and the color page printer 4.

The state machine 37 detects whether the bus is in a busy state, in which packet data is being transmitted (packet data communication state), or a silent state, in which data is not being transmitted (i.e., idle state). The state machine 37 sends a high state detection signal SG4 to the determining circuit 33 when the bus is in a busy state and a low state detection signal SG4 to the determining circuit 33 when the bus is in an idle state.

Control data is transmitted between the link layer processing circuit portion 32 and the host controller 12 via the peripheral circuit 22 and the host I/F 23. The link layer processing circuit portion 32 analyzes whether the data from the state machine 37 is intended for the link layer processing circuit portion 32 itself. If the data is intended for the link layer processing circuit portion 32, the link layer processing circuit portion 32 transmits data to a predetermined internal device in the personal computer 1 in accordance with the control data from the host controller 12.

The link layer processing circuit portion 32 adds a header, which includes transmission location data, to data generated by an internal device (not shown) of the personal computer 1 in accordance with the control data from the host controller 12. The data including the header is sent to the state machine 37. In other words, predetermined format data that designates the transmission location is generated.

The link layer processing circuit portion 32 controls the data transmission modes, which include an isochronous transmission mode and an asynchronous transmission mode. The isochronous transmission mode is used for the transmission of image data formed by a large amount of data that requires continuity, such as dynamic images. Data is transmitted at predetermined time periods in the isochronous transmission. In the asynchronous transmission mode, data is transmitted during periods other than the isochronous transmission mode.

The link layer processing circuit portion 32 detects whether or not it is in the isochronous transmission mode. The link layer processing circuit portion 32 sends a high mode detection signal SG5 to the determining circuit 33 when in the isochronous transmission mode and a low mode detection signal SG5 to the determining circuit 33 when not in the isochronous transmission mode.

The determining circuit 33 receives the first and second trigger signals SG1, SG2 from the host controller 12, the state detection signal SG4 from the state machine 37, and the mode detection signal SG5 from the link layer processing circuit portion 32. The determining circuit 33 checks the first and second trigger signals SG1, SG2. If either trigger signal SG1, SG2 is high, the determining circuit 33 checks the mode detection signal SG5. If the mode detection signal SG5 is low and if the state detection signal SG4 is low, the determining circuit 33 changes the state of the control signal SG3 to change the state of the switch SW.

More specifically, with reference to FIG. 6, the determining circuit 33 outputs a low control signal SG3 when the first and second trigger signals SG1, SG2 are both low. If the power switch of the personal computer 1 is turned on, which causes the first trigger signal SG1 to go high, and the determining circuit 33 determines that the mode detection signal SG5 is high (isochronous transmission mode), the control signal SG3 remains low. If the determining circuit 33 determines that the mode detection signal SG5 is low (the mode is not the isochronous transmission mode) and that the state detection signal SG4 is high (the bus is busy), the control signal SG3 remains low. However, if the determining circuit 33 determines that the state detection signal SG4 is low (the bus is idle), the control signal SG3 goes high.

Figure 7:
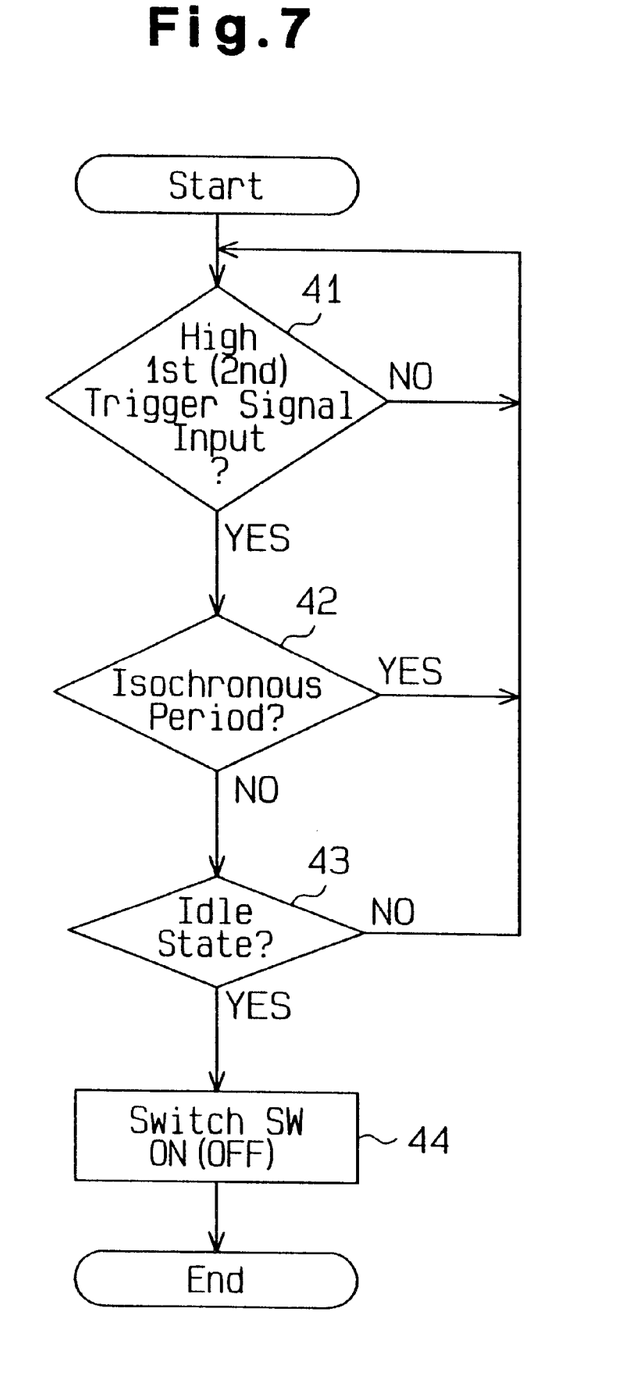
FIG. 7 is a flowchart illustrating the operation of the I/F controller of FIG. 4.

FIG. 7 is a flowchart illustrating the operation of the I/F controller 13. The I/F controller 13 repeats step 41 until, for example, a high first trigger signal SGl is received. If the I/F controller 13 determines that the first trigger signal SGl is high, the I/F controller 13 proceeds to step 42 and checks whether isochronous transmission is being performed. Steps 41 and 42 are repeated as long as isochronous transmission is being performed. That is, steps 41 and 42 are repeated until the mode detection signal SG5 goes low. When the mode detection signal SG5 falls, the I/F controller 13 proceeds to step 43 and checks whether the bus is in an idle state. Steps 41 to 43 are repeated as long as the bus is in a busy state. That is, steps 41 to 43 are repeated until the state detection signal SG4 falls. When the state detection signal SG4 falls, the I/F controller 13 proceeds to step 44 and provides a high control signal SG3 to the switch SW to close the switch SW.

If the power switch of the personal computer 1 is turned on during the isochronous transmission mode, the I/F controller 13 keeps the control signal SG3 low until the isochronous transmission mode is finished and causes the control signal SG3 to rise when the idle state begins. The switch SW is closed when the control signal SG3 becomes high. This supplies the regulator 15 with the system power VDDsys from the system power circuit 11 via the regulator 14 and the switch SW. Thus, the I/F controller 13 closes the switch SW when data transmission cannot be affected.

Accordingly, power switch noise is eliminated and power noise is prevented from mixing with the operation power VDDif of the I/F controller 13 from when the power of the personal computer 1 is turned on to when the switch SW is closed. Even if power noise does mix with the operation power VDDif, the switch SW is closed when data transmission by the I/F controller 13 cannot be affected. Thus, the noise does not affect the data transmission by the controller 13. Furthermore, the noise produced when closing the switch SW does not affect the operation of the controller 13.

With reference to FIG. 6, a state in which the second trigger signal SG2 goes high due to an OFF command of the power switch of the personal computer 1 (when the off sequence is commenced) will now be described. If the determining circuit 33 determines that the mode detection signal SG5 is high (the isochronous transmission mode), the determining circuit 33 keeps the control signal SG3 high. If the determining circuit 33 determines that the mode detection signal SG5 is low (the mode is not in the isochronous transmission mode) and that the state detection signal SG4 is high (the bus is busy), the determining circuit 33 keeps the control signal SG3 high. However, if the determining circuit 33 determines that the state detection signal SG4 is low (the bus is idle), the control signal SG3 falls.

As shown in FIG. 7, the I/F controller 13 repeats step 41 until a high second trigger signal SG2 is received. If the I/F controller 13 determines that the second trigger signal SG2 is high, the I/F controller 13 proceeds to step 42 and checks whether isochronous transmission is being performed based on the mode detection signal SG5. Steps 41 and 42 are repeated as long as isochronous transmission is being performed. When the mode detection signal SG5 falls, the I/F controller 13 proceeds to step 43 and checks whether the bus is in an idle state. Steps 41 to 43 are repeated as long as the bus is in a busy state. When the state detection signal SG4 falls, the I/F controller 13 proceeds to step 44 and provides a low control signal SG3 to the switch SW to open the switch SW.

If the bus is in an isochronous transmission mode when the off sequence of the personal computer 1 is commenced, the I/F controller 13 waits until the isochronous transmission mode ends and outputs a low control signal SG3 when the idle state begins. The switch SW is opened by a low control signal SG3 and the system power VDDsys then goes off when the off sequence ends. Accordingly, the switch SW is opened before the system power VDDsys of the personal computer 1 goes off. Thus, noise produced when the system power VDDsys is cut does not mix with the operation power VDDif of the I/F controller 13. Accordingly, data transmission by the controller 13 is not affected by noise.

Furthermore, the switch SW is opened after the bus enters an idle state subsequent to commencement of the off sequence of the personal computer 1. That is, the switch SW is opened when data transmission by the I/F controller 13 cannot be affected. Accordingly, noise produced by the deactivation of the switch SW does not affect the operation of the I/F controller 13.

The preferred and illustrated embodiment has the advantages described below.

(1) When the power switch of the personal computer 1 is turned on, the determining circuit 33 sends a high control signal SG3 to the switch SW in response to a high first trigger signal SG1, a low mode detection signal SG5 (the mode is not the isochronous transmission mode), and a low state detection signal SG4 (the bus is idle). In other words, the I/F controller 13 keeps the switch SW open from when the power switch of the personal computer 1 is turned on to when the bus enters an idle state and closes the switch SW when the closing of the switch SW can no longer affect the data transmission by the controller 13.

Accordingly, power switch noise of the personal computer 1 is eliminated until the switch SW is closed and such noise does not mix with the operation power VDDif of the I/F controller 13. Even if such power noise does mix with the operation power VDDif, the switch SW is closed at a time when data transmission by the I/F controller 13 is unaffected. Furthermore, the noise produced by the activation of the switch SW does not affect the operation of the controller 13.

(2) When an off command of the power switch of the personal computer 1 is issued (when the off sequence is commenced), the determining circuit 33 sends a low control signal SG3 to the switch SW in response to a high second trigger signal SG2, a low mode detection signal SG5 (the mode is not the isochronous transmission mode), and a low state detection signal SG4 (the bus is idle). In other words, the I/F controller 13 keeps the switch SW closed from when the off sequence is commenced to when the bus enters an idle state and opens the switch SW when the opening of the switch SW can no longer affect the data transmission by the controller 13. The system power is then turned off upon completion of the off sequence.

Accordingly, the switch SW is opened before the system power of the personal computer 1 is turned off. Thus, the noise produced when cutting the system power VDDsys does not mix with the operation power VDDif of the I/F controller 13. As a result, data transmission is unaffected. Furthermore, the switch SW is opened at a time that data transmission at the bus cannot be affected. Thus, the noise produced when cutting the system power VDDsys does not mix with the operation power VDDif. As a result, the data transmission by the controller 13 is unaffected. Since the switch SW is opened at a time that does not affect data transmission at the bus, the noise produced by the opening of the switch SW does not affect the operation of the I/F controller 13.

(3) The switch SW is closed and opened when the state detection signal SG4 falls (the bus is idle). Accordingly, data transmission at the bus is unaffected.

(4) The switch SW is closed and opened when the mode detection signal SG5 falls (when isochronous transmission is not being performed). Accordingly, an idle state, corresponding to the period during which isochronous transmission is not being performed, is maintained for a relatively long period in a stable manner. Thus, data transmission at the bus is unaffected.

It should be apparent to those skilled in the art that the present invention may be embodied in many other specific forms without departing from the spirit or scope of the invention. Particularly, it should be understood that the present invention may be embodied in the following forms.

The interface circuit 19, which includes the I/F controller 13, the regulators 14, 15, the diode 16, and the switch SW, may be mounted on a PC board, and the host controller 12 may be mounted on a motherboard. In this case, the PC board may be inserted into a slot of the motherboard or attached to the exterior of the personal computer.

The switch SW may be closed and opened only when the power switch of the personal computer 1 is ON or only when the power switch is OFF.

The state machine 37 may output the state detection signal SG4 based on the operation state of the state machine 37 itself. For example, the state machine 37 may output a low state detection signal SG4 when maintaining an idle state.

The switch SW may be closed and opened when not in the idle state as long as the activating and deactivating timing does not affect data transmission at the bus. For example, the switch SW may be closed and opened during an arbitration period for obtaining the right to use the bus. This is possible since the arbitration period has a data cycle that is longer than that of the packet data transmission period and the affect of noise on the data is thus small. The I/F controller 13 may execute bus reset in accordance with high trigger signals SG1, SG2 when isochronous transmission is not being performed. This causes the I/F controller 13 to force the bus into an idle state, thereby closing or opening the switch SW during the idle state. As a result, the power switching noise of the personal computer 1 does not affect the data transmission by the I/F controller 13 in an undesirable manner.

The present examples and embodiments are to be considered as illustrative and not restrictive, and the invention is not to be limited to the details given herein, but may be modified within the scope and equivalence of the appended claims.

What is claimed is:

1. A method for controlling a system power supply to an interface circuit that is operated by at least the system power supply or an external power supply, wherein the interface circuit performs data transmission, the method comprising:
   generating a trigger signal indicating that the system power supply has gone on; and
   closing a switch between the system power supply and the interface circuit at a timing that does not affect the data transmission in accordance with the trigger signal.

2. The method according to claim 1, wherein the time when the switch is closed is a time other than a time when the interface circuit is performing isochronous transmission.

3. The method according to claim 2, wherein the interface circuit is connected to a device via a bus for transferring data, and wherein the time when the switch is closed occurs when the bus is in an idle state.

4. A method for controlling a system power supply to an interface circuit that is operated by at least the system power supply or an external power supply, wherein the interface circuit performs data transmission, the method comprising:
   generating a trigger signal indicating that the system power supply has gone off; and
   opening a switch between the system power supply and the interface circuit at a time that does not affect the data transmission in accordance with the trigger signal.

5. The method according to claim 4, wherein the time when the switch is opened is a time other than a time when the interface circuit is performing isochronous transmission.

6. The method according to claim 5, wherein the interface circuit is connected to a device via a bus for transferring data, and wherein the time when the switch is opened occurs when the bus is in an idle state.

7. A method for controlling a system power supply to an interface circuit that is operated by at least the system power supply or an external power supply, wherein the interface circuit performs data transmission, the method comprising:
   generating a first trigger signal indicating that the system power supply has gone on;
   closing a switch between the system power supply and the interface circuit at a timing that does not affect the data transmission in accordance with the first trigger signal;
   generating a second trigger signal indicating that the system power supply has gone off;
   opening the switch at a timing that does not affect the data transmission in accordance with the second trigger signal.

8. The method according to claim 7, wherein opening and closing the switch is performed at times when the interface circuit is not performing isochronous transmission.

9. The method according to claim 8, wherein the interface circuit is connected to a device via a bus for transferring data, and wherein opening and closing the switch is performed at times when the bus is in an idle state.

10. An interface circuit for performing data transmission comprising:
    an interface controller operated by at least a system power supply or an external power supply; and
    a switch connected between an interface controller and a system power circuit for conducting system power, wherein the interface controller includes a control signal generating circuit for generating a control signal that closes the switch at a timing that does not affect the data transmission in accordance with a trigger signal, which indicates that the system power has gone on.

11. The interface circuit according to claim 10, wherein the interface controller includes a link layer processing circuit for detecting that isochronous transmission is not being performed and for generating a detection signal, and wherein the control signal generating circuit generates the control signal in accordance with the detection signal and the trigger signal.

12. The interface circuit according to claim 11, wherein the interface controller includes a physical layer processing circuit for detecting an idle state of the interface circuit and for generating an idle state detection signal, and wherein the control signal generating circuit generates the control signal in accordance with the state detection signal and the trigger signal.

13. An interface circuit for performing data transmission comprising:
    an interface controller operated by at least a system power supply or an external power supply; and
    a switch connected between an interface controller and a system power circuit for conducting system power, wherein the interface controller includes a control signal generating circuit for generating a control signal that opens the switch at a timing that does not affect the data transmission in accordance with a trigger signal, which indicates that the system power has gone off.

14. The interface circuit according to claim 13, wherein the interface controller includes a link layer processing circuit for detecting that isochronous transmission is not being performed and for generating a detection signal, and wherein the control signal generating circuit generates the control signal in accordance with the detection signal and the trigger signal.

15. The interface circuit according to claim 14, wherein the interface controller includes a physical layer processing circuit for detecting an idle state of the interface circuit and for generating an idle state detection signal, and wherein the control signal generating circuit generates the control signal in accordance with the state detection signal and the trigger signal.

16. An interface circuit for performing data transmission comprising:
    an interface controller operated by at least a system power supply or an external power supply; and a switch connected between an interface controller and a system power circuit for conducting system power, wherein the interface controller includes a control signal generating circuit for generating a first control signal that closes the switch at a timing that does not affect the data transmission in accordance with a first trigger signal, which indicates that the system power has gone on, the control signal generating circuit further generating a second control signal that opens the switch at a timing that does not affect the data transmission in accordance with a second trigger signal, which indicates that the system power has gone off.

17. The interface circuit according to claim 16, wherein the interface controller includes a link layer processing circuit for detecting that isochronous transmission is not being performed and for generating a detection signal, and wherein the control signal generating circuit generates the first and second control signals in accordance with the detection signal and the first and second trigger signals.

18. The interface circuit according to claim 17, wherein the interface controller includes a physical layer processing circuit for detecting an idle state of the interface circuit and for generating an idle state detection signal, and wherein the control signal generating circuit generates the first and second control signals in accordance with the state detection signal and the first and second trigger signals.

19. A data transmission device comprising:
an interface circuit that performs data transmission; and
a host controller connected to the interface circuit, wherein control signals are transmitted between the host controller and the interface circuit to control data transmission therebetween, wherein the interface circuit includes:
an interface controller operated by at least a system power supply or an external power supply; and
a switch connected between the interface controller and a system power circuit for conducting system power, wherein the interface controller has a control signal generating circuit for generating a control signal that closes the switch at a timing that does not affect the data transmission in accordance with a trigger signal, which indicates that the system power has gone on.

20. The data transmission device according to claim 19, wherein the interface controller includes a link layer processing circuit for detecting that isochronous transmission is not being performed and for generating a detection signal, and wherein the control signal generating circuit generates the control signal in accordance with the detection signal and the trigger signal.

21. The data transmission device according to claim 20, wherein the interface controller includes a physical layer processing circuit for detecting an idle state of the interface circuit and for generating an idle state detection signal, and wherein the control signal generating circuit generates the control signal in accordance with the state detection signal and the trigger signal.

22. A data transmission device comprising:
an interface circuit that performs data transmission; and
a host controller connected to the interface circuit, wherein control signals are transmitted between the host controller and the interface circuit to control data transmission therebetween, wherein the interface circuit includes:
an interface controller operated by at least a system power supply or an external power supply; and
a switch connected between the interface controller and a system power circuit for conducting system power, wherein the interface controller has a control signal generating circuit for generating a control signal that opens the switch at a timing that does not affect data transmission in accordance with a trigger signal, which indicates that the system power has gone off.

23. The data transmission device according to claim 22, wherein the interface controller includes a link layer processing circuit for detecting that isochronous transmission is not being performed and for generating a detection signal, and wherein the control signal generating circuit generates the control signal in accordance with the detection signal and the trigger signal.

24. The data transmission device according to claim 23, wherein the interface controller includes a physical layer processing circuit for detecting an idle state of the interface circuit and for generating an idle state detection signal, and wherein the control signal generating circuit generates the control signal in accordance with the state detection signal and the trigger signal.

25. A data transmission device comprising:
an interface circuit that performs data transmission; and
a host controller connected to the interface circuit, wherein control signals are transmitted between the host controller and the interface circuit to control data transmission therebetween, wherein the interface circuit includes:
an interface controller operated by at least a system power supply or an external power supply; and
a switch connected between the interface controller and a system power circuit for conducting system power, wherein the interface controller has a control signal generating circuit for generating a first control signal that closes the switch at a timing that does not affect the data transmission in accordance with a first trigger signal, which indicates that the system power has gone on, the control signal generating circuit further generating a second control signal that opens the switch at a timing that does not affect the data transmission in accordance with a second trigger signal, which indicates that the system power has gone off.

26. The data transmission device according to claim 25, wherein the interface controller includes a link layer processing circuit for detecting that isochronous transmission is not being performed and for generating a detection signal, and wherein the control signal generating circuit generates the first and second control signals in accordance with the detection signal and the first and second trigger signals.

27. The data transmission device according to claim 26, wherein the interface controller includes a physical layer processing circuit for detecting an idle state of the interface circuit and for generating an idle state detection signal, and wherein the control signal generating circuit generates the first and second control signals in accordance with the state detection signal and the first and second trigger signals.

* * * * *